May 7, 1968 F. B. STIEG 3,382,303
PROCESS AND APPARATUS FOR MAKING REGENERATED CELLULOSE SPONGES
Filed May 3, 1966 3 Sheets-Sheet 1
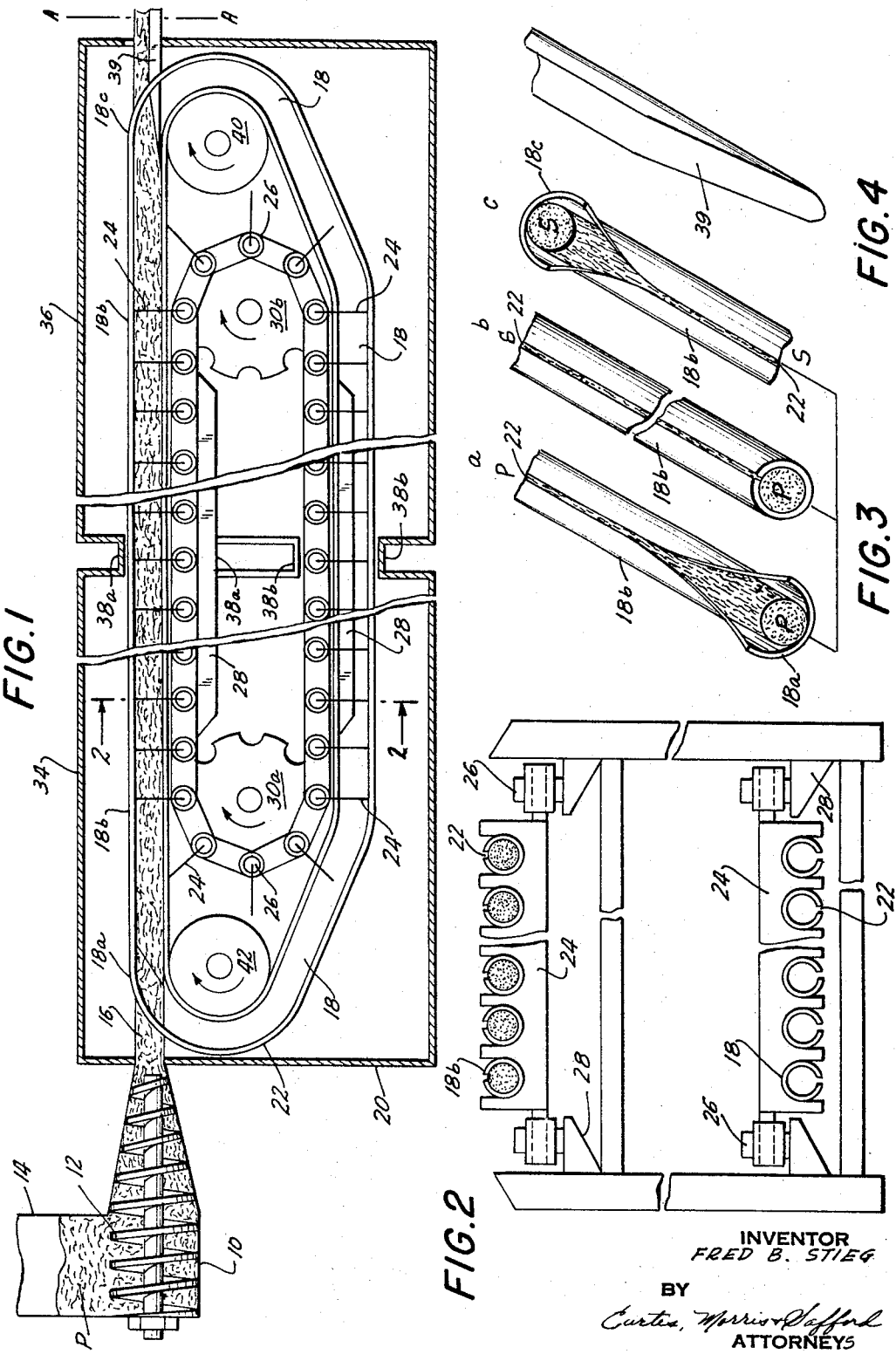
INVENTOR
FRED B. STIEG
BY
Curtis, Morris & Safford
ATTORNEYS

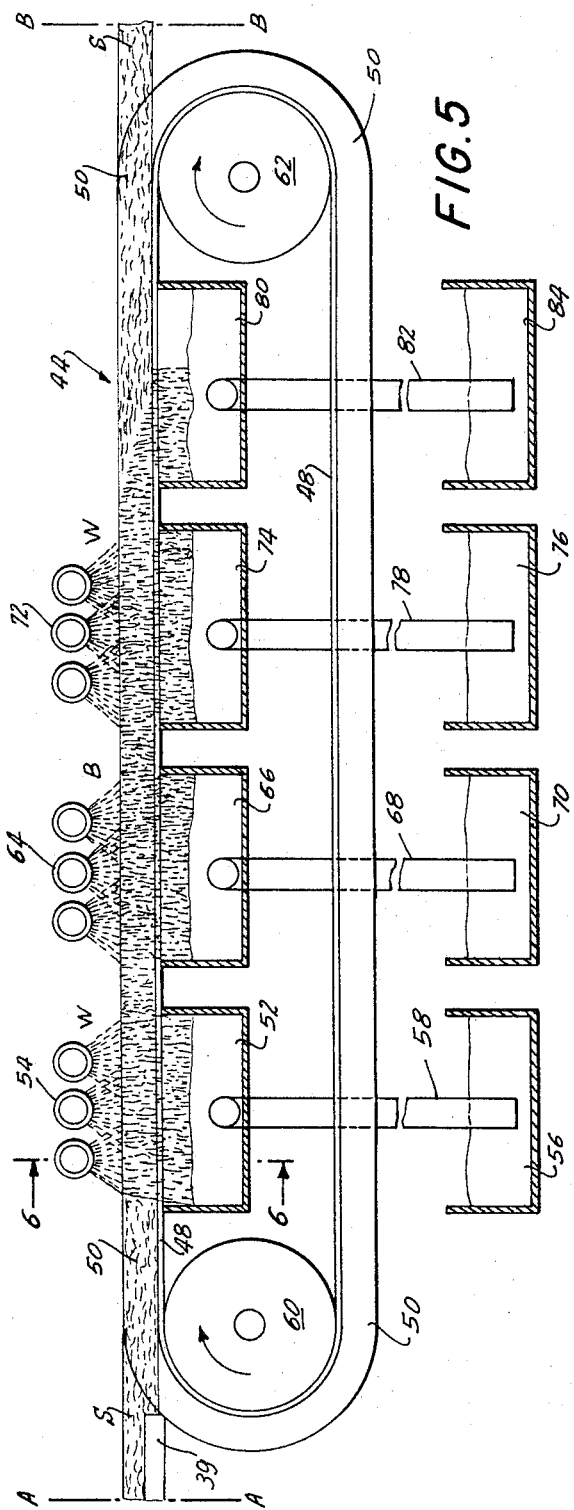
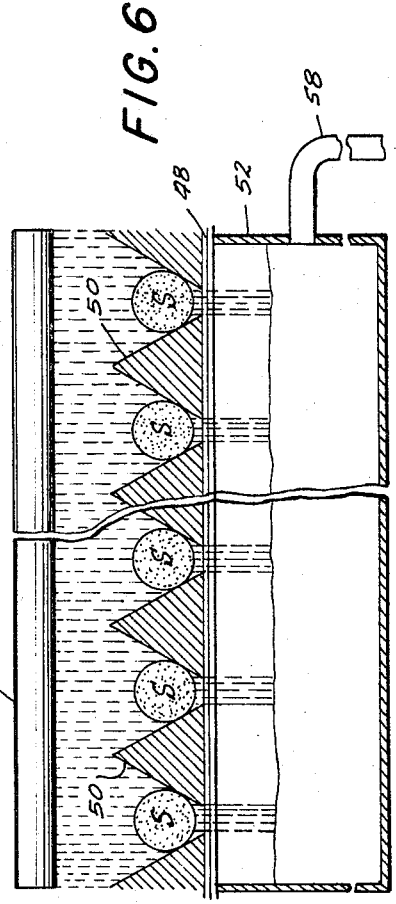

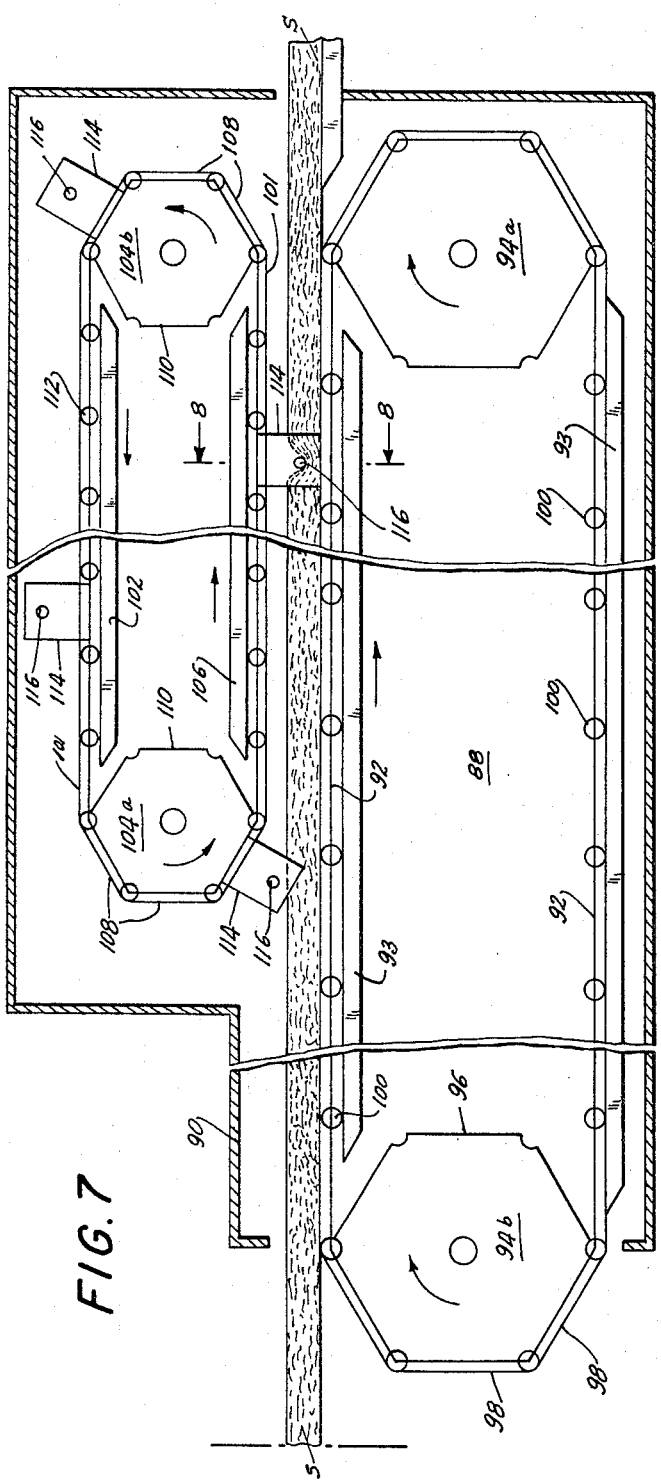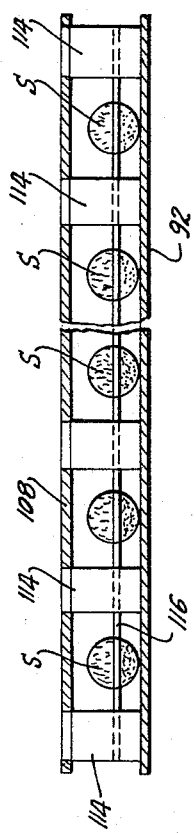

United States Patent Office 3,382,303
Patented May 7, 1968

3,382,303
PROCESS AND APPARATUS FOR MAKING REGENERATED CELLULOSE SPONGES
Fred B. Stieg, 35—16 85th St.,
Jackson Heights, N.Y. 11372
Continuation-in-part of application Ser. No. 803,848,
Apr. 3, 1959. This application May 3, 1966, Ser.
No. 547,382
6 Claims. (Cl. 264—49)

ABSTRACT OF THE DISCLOSURE

A process and apparatus for making regenerated cellulose sponges by continuously extruding a sponge forming paste composition into moving endless molds so that the sponge forming paste composition remains stationary in the moving molds while being moved through apparatus for regenerating the cellulose of the viscose solution to form a complete sponge having a multiplicity of pores.

---

This invention relates to regenerated cellulose sponges, more particularly it relates to a process for the continuous production of regenerated cellulose sponges and apparatus for carrying out the process; and this application is a continuation-in-part of my copending application, Ser. No. 803,848 filed Apr. 3, 1959, now U.S. Patent No. 3,261,704, issued July 19, 1966.

Heretofore it has been proposed that regenerated cellulose sponges be made by continuously extruding a mixture of viscose solution, reinforcing fibres and coarse or medium coarse pore-forming crystalline salts through stationary open end molds maintained at a temperature of at least 100° C. to regenerate the cellulose of the viscose solution to form a regenerated cellulose sponge. It has been found that, because of the paste-like structure of the mixed ingredients, deformation of the mixed mass occurs while it is being pressed forward through the heated open end mold so that satisfactory formation is not accomplished.

My invention overcomes this deformation shortcoming of the stationary open end mold apparatus of the prior art and results in producing cellulose sponges of a quality consistent with sponges produced by the more conventional but slow and costly batch methods. In addition, my invention reduces substantially the cutting losses usually experienced when sponges are made by batch methods. In some sponge uses my method and apparatus may eliminate such losses altogether.

In accordance with the present invention, cellulose sponges of indeterminate and continuous lengths may be produced by my continuous process. By my process and apparatus the mixed mass of ingredients used to form the sponge is continuously extruded into or onto an endless mold and thereafter, it remains stationary in the mold while the filled mold continuously moves along a selected path at a predetermined rate through a suitable regenerating media to form the desired sponge.

The molds are endless with some lineal opening at the top portion. Examples of such mold are: cylindrical ones of any preferred diameter but only slightly open at the top when layed horizontally; elliptical ones of any preferred short and long diameters but only slightly open at the top when layed horizontally; rectangular ones of any preferred dimensions but completely or partially open at the top when layed horizontally; and those of any other preferred shape, width and depth and completely open at the top when layed horizontally. Such cylindrical, elliptical and some rectangular molds are characterized by being openable to the extent of their being further opened for proper extrusion of the sponge forming mixed mass of ingredients into the molds; then caused to return to their slightly open top shape during regeneration to form the sponge and, again, similarly further opened for the proper removal of the formed sponge from the molds after regeneration. During regeneration the slightly open top molds advantageously allow for the escape of any gases formed. Usually in molds which are closed at the top, as in the prior art, any gases formed accumulate and cause deformation of the sponge being formed. Of course, all completely open top molds also allow for the escape of such gases during regeneration.

Before describing my invention in detail, it is to be understood that reference to a specific illustrated embodiment of my invention is primarily intended to aid those skilled in the art to understand and appreciate fully the features and advantages of my invention but is not intended to limit the invention, which is defined with more particularity in the appended claims.

In the drawings:

FIGURE 1 is a partially fragmentary side view of the extrusion and regenerating apparatus in accordance with the present invention;

FIGURE 2 is a transverse sectional view through the structure of FIGURE 1 along line 2a—2a;

FIGURES 3a, b and c are a series of schematic perspective views of various stages of completely filled molds suitable for forming sponges of indeterminate and continuous length in the regenerating apparatus of FIGURE 1;

FIGURE 4 is a fragmentary perspective view of the release mechanism for removing the formed sponge from the sponge forming mold;

FIGURE 5 is a continuation of apparatus shown in FIGURE 1 at match lines A—A illustrating a partially fragmentary side view of the sponge washing, bleaching, rewashing and water extracting apparatus;

FIGURE 6 is a transverse sectional view through the structure of FIGURE 5 along lines 6—6;

FIGURE 7 is a continuation of apparatus shown in FIGURE 5 at match lines B—B and shows a partially fragmentary side view of an apron drying apparatus with added features for drying formed regenerated cellulose sponge of indeterminate and continuous length;

FIGURE 8 is a transverse sectional view through the structure of FIGURE 7 along lines 8—8; and FIGURE 9 is an enlarged view of the formed sponge of FIGURE 7 along lines 8—8.

In carrying out the process of my invention, sheets of purified cellulose are first treated with an excess of 18% to 20% caustic soda solution to yield alkali cellulose. The swollen sheets of this alkali cellulose in turn are compacted or squeezed back to approximately the original thickness of the sheets to rid the sheets of excess caustic solution beyond that portion desired to be retained. Next the sheets are disintegrated or shreaded to form alkali cellulose crumb and the crumb is then treated with carbon disulphide to form cellulose xanthate. To this is added sufficient dilute caustic soda solution to yield a viscose solution, preferably containing 8% cellulose in the form of xanthate and 9% caustic soda.

In a preferred embodiment of the process of my invention the 8% cellulose content viscose solution is diluted with water to arrive at a viscose solution containing from 4% to 6% cellulose in the form of xanthate. When comminuted cellulose is not a component of the resultant sponge, water alone is used to dilute the 8% cellulose content viscose solution. When a sponge containing comminuted cellulose is preferred, the comminuted cellulose is first dispersed in the water used for diluting the 8% cellulose content viscose solution to arrive at a viscose solution containing from 4% to 6% cellulose in the form of xanthate. In a preferred embodiment of the process of my invention, fine-pore forming crystals are added to such 4% to 6% cellulose content viscose solution to form a mixed mass paste composition that is suitable for continuous extrusion into the apparatus of my invention.

Examples of typical mixed mass paste compositions for regenerating the cellulose of the viscose solution component of the mixed mass into regenerated cellulose sponge of indeterminate and continuous length, according to the process of my invention, are as follows:

EXAMPLE A

|  | Percent |
|---|---|
| Viscose solution, 8% cellulose content | 19.5 |
| Water | 18.4 |
| Comminuted cellulose | 1.4 |
| Fine pore-forming crystals | 60.7 |
| Total | 100.0 |

This composition of paste contains comminuted cellulose without reinforcing fibres. The total cellulose content of the paste is 2.96% while the cellulose content of the resulting sponge will be 100.0%. This example is typical of the paste composition to produce a sponge as claimed in U.S. Patent No. 2,880,726, issued Apr. 7, 1959, to me.

EXAMPLE B

|  | Percent |
|---|---|
| Viscose solution, 8% cellulose content | 26.0 |
| Water | 11.9 |
| Fine pore-forming crystals | 62.1 |
| Total | 100.0 |

This composition of paste does not contain comminuted cellulose or reinforcing fibres. The total cellulose content of the paste is 2.08% while the cellulose content of the resulting sponge will be 100.0%. This example is typical of the paste composition to produce a sponge as claimed in my copending application, Ser. No. 803,848 filed Apr. 3, 1959.

Other paste compositions may be formulated wherein the total cellulose content of the paste will be from about 1.5% to about 4%. Within this range, some part of the total cellulose in the paste composition may be reinforcing fibres, with or without comminuted cellulose, and coarse or medium coarse por-forming crystals used when a coarse or medium coarse pore sponge is to be made. Also, the 8% cellulose content viscose solution need not necessarily be diluted with water to make a 4% to 6% cellulose content viscose solution when reinforcing fibres and/or coarse or medium coarse pore-forming crystals are used.

Several crystalline salts have been proposed as a pore-forming component of the paste composition used to make a sponge. However, I prefer to use fine crystals of tri-sodium phosphate when making fine pore sponges. When making coarse or medium coarse pore sponges, I prefer to use coarse or medium coarse crystals of sodium sulphate.

It is to be understood that "fine pore-forming crystals" as used herein may be defined as a range of crystal sizes wherein all the crystals pass a 40 mesh U.S. Standard screen, at least 95% pass a 50 mesh screen with from 35% to 50% by weight preferably passing a 100 mesh screen. In contrast to the fine pore-forming crystals, "large pore-forming crystals" may be defined as those within a range of crystals not smaller than ⅛ inch and to crystals not larger than ½ inch in diameter. A range of crystals larger than the fine pore-forming crystals and smaller than the coarse pore-forming crystals may also be used in the process and apparatus to continuously make sponge of indeterminate and continuous length when a sponge of intermediate pore size is desired to be made.

The apparatus for carrying out the regeneration of the cellulose of the viscose solution component of the paste composition is preferably divided into two substantially independent chambers, preferably attached one to the other by connecting ports or passageways.

The method

In carrying out the process of my invention to make coarse or medium coarse pore sponge, a conventional mixed mass sponge forming paste composition containing coarse or medium coarse pore-forming crystals is continuously extruded into an endless open top mold. Thereafter, the sponge forming paste composition remains stationary in the mold while the filled mold continuously moves forward away from the nozzle of the extruding apparatus along a preselected path and at a predetermined rate through the two regenerating apparatus chambers. Both chambers are preferably maintained at a substantially constant temperature of from about 95° C. to about 100° C. so that the cellulose of the viscose solution component of the sponge forming paste composition becomes regenerated to a coarse or medium coarse pore sponge of indeterminate and continuous length just prior to its arrival at a point farthest removed from the nozzle of the extruding apparatus. From ½ hour to 15 hours are required for any one point on the filled mold to continuously move forward at the predetermined rate through the length of the two regenerating apparatus chambers to cause a sponge ot be made, the difference in times being dependent upon the difference in diameters of the sponge desired to be made.

In a preferred embodiment of the process of my invention, to effect proper regeneration of the cellulose of the viscose solution component of the paste composition containing fine pore-forming crystals to make a fine pore sponge of indeterminate and continuous length, the paste composition is continuously extruded into an endless slightly open top mold. After that, the sponge forming paste composition remains stationary in the mold while the filled mold continuously moves forward away from the nozzle of the extruding apparatus along the preselected path at a predetermined rate through the first stage chamber of the regenerating apparatus. This chamber is maintained at a substantially constant temperature of from about 55° C. to about 75° C. so that the cellulose of the viscose solution component of the paste composition becomes partially regenerated to a substantially immobile and homogeneous gel-like mass just prior to movement out of the first stage chamber of the regenerating apparatus. The endless mold, still slightly open at the top and still with its contents remaining stationary in the mold as before, continuously moves forward at the same predetermined rate out of the first stage chamber and into and through the second stage chamber of the regenerating apparatus, the second stage chamber being maintained at a substantially constant temperature of from about 95° C. to about 100° C. In this second chamber the partially regenerated cellulose gel-like mass in the mold becomes completely regenerated to a fine pore regenerated cellulose sponge of indeterminate and continuous length just prior to arrival at a point usually farthest removed from the port attaching the second stage chamber to the first stage chamber of the regenerating apparatus. When employing an endless cylindrical mold having an inside diameter approximately 0.493 inch, about 15 minutes is required for any one point on the filled mold to continuously move through the length of the first stage chamber in order to have the contents of the mold, at this time lapse, become a substantially immobile and homogeneous gel-like mass. An additional 15 minutes is required for this same point on the filled mold, moving forward at the same predetermined rate, to pass out of the first stage chamber and into and through the second stage chamber of the regenerating apparatus to have the stationary partially regenerated cellulose gel-like mass in the mold, at this same point on the mold, become completely regenerated to a fine pore regenerated cellulose sponge of indeterminate and continuous length. When a mold larger than about 0.493 inch in inside diameter and/or of a shape other than cylindrical is employed the times for processing the sponge forming paste composition in the first and second stage chambers of the regenerating apparatus are increased accordingly to accomplish the desired results of regeneration.

The now regenerated cellulose sponge of indeterminate and continuous length, whether coarse, medium or fine pore, is continuously removed from its continuously forward moving mold at the end of the second stage chamber. The formed sponge is continuously moved forward out of the second stage chamber onto and through apparatus for continuously washing the sponge with water, preferably 80° C. water, to rid it of processing chemicals. It is next moved onto and through apparatus for continuously bleaching it with dilute liquid bleach. After this the sponge is moved onto and through apparatus for continuously washing it with water to rid the sponge of residual spent bleach and, then, onto and through apparatus for continuously reducing the water content of the wet sponge of indeterminate and continuous length before it enters drying apparatus.

The now partially dewatered regenerated cellulose sponge, whether coarse, medium or fine pore, is continuously passed into and through drying apparatus. The drying apparatus is preferably an apron dryer with added features. The sponge in passing through the drying apparatus is preferably dried by relatively low temperature high humidity counter current circulating air in the drying apparatus. After emerging from the dry end of the drying apparatus, the dried sponge is cut into convenient lengths for handling and packaging for shipment.

The process of my invention is described hereinbefore as having employed one endless mold filled with sponge forming paste composition to produce one sponge of indeterminate and continuous length. It is to be understood that a multiple of such molds may be used to produce many sponges at the same time. Accordingly, the apparatus can be of sufficient width to accommodate a multiple of endless molds as shown in drawing FIGURE 2 and the washing, bleaching, rewashing and water extracting apparatus as shown in drawing FIGURE 6 as well as the drying apparatus as shown in drawing FIGURE 8 will also be of sufficient width to process the same number of formed sponges.

The apparatus

The continuous process of the present invention may advantageously be carried out by using the illustrated apparatus shown in the drawings herein.

As shown in FIGURE 1 a conventional type of extruding apparatus 10 is cooperatively attached to a regenerating apparatus 20. The apparatus 20 provides for the continuous production of the regenerated cellulose sponges of indeterminate and continuous lengths.

The extruding apparatus 10 includes a hopper 14, an extruding nozzle 16 and a screw 12, the screw being driven by motor which is not shown.

The regenerating apparatus 20 includes two chambers 34 and 36 connected, one to the other by ports 38a and 38b. Chamber 34 is preferably a closed chamber while chamber 36 is vented for the escape of any gases formed as well as for the release of any other vapors. The sides, ends and top walls of both chambers are preferably insulated on the outside to minimize heat loss. Also the chamber walls may be sectional and readily removed, in whole or in part, for inspection and maintenance of the internal working parts.

The internal working parts of the regenerating apparatus 20 includes sprocket wheel 30a in chamber 34 and sprocket wheel 30b in chamber 36 on which is mounted an endless link-belt roller conveyor chain 26 supported on tracks or rails 28. Each link of the conveyor chain 26 is preferably about 2 inches long and on each link is attached a mold supporting frame 24 as shown in FIGURE 2. An endless resilient mold 18 is mounted on supporting frames 24 and on a pulley 42 in chamber 34 and on a pulley 40 in chamber 36 as shown in FIGURE 1.

As shown in FIGURE 1 the extruder nozzle 16 is positioned immediately above pulley 42 in chamber 34 and a sponge release mechanism 39 is positioned immediately above pulley 40 in chamber 36 of regenerating apparatus 20.

As shown in FIGURES 5 and 6, a washing apparatus 44 is adjacent to the release mechanism 39 and is comprised of spray nozzles 54, 64 and 72, suction boxes 52, 66, 74 and 80, conduits 58, 68, 78 and 82, receiving tanks 56, 70, 76 and 84, pulleys 60 and 62 and an endless woven wire open mesh screen conveyor 48 on which are attached endless spacers 50. The spacers 50 are preferably made of rubber. The screen conveyor 48 is mounted on pulleys 60 and 62 as well as supported on and passing over suction boxes 52, 66, 74 and 80. The apparatus 44 provides for the continuous washing, bleaching, rewashing and partial dewatering of the formed regenerated cellulose sponge moving forward out of the regenerating apparatus 20.

In FIGURE 7 a drying apparatus 88 is shown which is used to dry the formed sponge S. The dryer 88 is preferably positioned within an enclosure 90 which is insulated to minimize heat loss.

Dryer 88 includes sprocket wheels 94a and 94b on which is mounted an endless conveyor 92 supported on tracks or rails 93. The endless conveyor 92 is an assembly of individual flights 98 that mesh with the flat surfaces 96 of the sprocket wheels 94a and 94b. Flights 98 are constructed of steel frames with open mesh woven steel wire screens attached thereto. Each flight 98, one attached to the other, is equipped with non-magnetic rollers 100.

The dryer 88 also includes a conveyor 101 mounted on sprocket wheels 104a and 104b and supported on tracks or rails 102 and 106. Conveyor 101 has an assembly of individual flights 108 that mesh with the flat surfaces 110 of sprocket wheels 104a and 104b. Flights 108 are constructed of open steel frames, one attached to the other, by rollers 112. Sprocket wheel 104b is preferably positioned immediately above sprocket wheel 94a.

Electro-magnets 114 are mounted on flights 108 of conveyor 101 at established intervals and are attached, one to the other, by sponge compression pins 116. Track or rail 106 serves two purposes: first, to cause electro-magnets 114 to make proper contact with the dryer conveyor 92; and, secondly, to serve as a source of electrical energy to activate the electro-magnets 114 when magnets are in proper position in relation to dryer conveyor 92. The apparatus 88 provides for the continuous and proper drying of the formed regenerated cellulose sponge.

The sprocket wheel 30b in regenerating apparatus 20, the pulley 62 in washing, bleaching, rewashing and dewatering apparatus 44 and sprocket wheel 94a in drying apparatus 88 all are motor driven at the same peripheral speed and in the direction shown so that the endless link-belt roller conveyor chain 26, the woven wire open mesh screen conveyor 48 and the endless dryer conveyor 92 move forwardly at the same predetermined rate. The endless conveyor 101 makes rigid contact with the endless conveyor 92 and is also propelled and moves forward at the same predetermined rate.

The motor (not shown, but well known) which rotates sprocket wheel 94a is preferably also manually controlled by gear reduction apparatus or otherwise to increase or decrease the forward movement of conveyor 92 when required to compensate for and control lineal shrinkage and avoid any warpage of the regenerated cellulose sponge of indeterminate and continuous length dried in apparatus 88. If desired, automatic control equipment may be used in place of the manual control.

The motor driving screw 12 in the extruder of apparatus 20, is preferably a variable speed motor to permit control of the delivery of sponge forming paste composition P from the extruder nozzle 16 into the endless resilient mold 18.

The endless link-belt roller conveyor chain 26, with attachments shown in apparatus 20 includes an endless slitted resilient mold 18. When the apparatus is operating, the endless slitted slightly open top 22 resilient mold 18 moves up and over pulley 42 in chamber 34 of regenerating apparatus 20 and makes contact with the extruder nozzle 16 at 18a and thereby surrounds nozzle 16 and becomes further opened. It then moves forwardly away from the nozzle 16 and makes contact with and becomes attached to mold supporting frames 24 at point 18b, preferably immediately above sprocket wheel 30a. While attached to the mold supporting frames 24, the mold 18 is caused to return to its slightly open top shape and moves through chamber 34, port 38a and chamber 36 to point 18b, preferably immediately above sprocket wheel 30b. At this point it becomes detached from the mold supporting frames 24 and moves forward making contact with the sponge release mechanism 39. It now surrounds sponge release mechanism 39 at 18c and becomes further opened, then moves down and under pulley 40 in chamber 36 and moves in a counter direction contacting and becoming attached to inverted mold supporting frames 24, preferably immediately under sprocket wheel 30b. It continues, while attached to supporting frames 24, back through chamber 36, port 38b and chamber 34 to a point preferably immediately under sprocket wheel 30a. It now becomes detached from the frames 24 and moves up and over pulley 42 in chamber 34 to repeat the operating cycle.

The endless woven wire open mesh screen conveyor 48 in apparatus 44 when operating moves onto up and over pulley 60, and onto and over suction box 52 under water spray nozzles 54. It then passes onto and over suction box 66 under bleach spray nozzles 64 and, then, onto and over suction box 74 under water spray nozzles 72 and onto and over suction box 80. Next, it moves onto, down and under pulley 62 and turns in a counter direction and moves under suction boxes 80, 74, 66 and 52 to make contact with, move up and over pulley 60 as before to repeat the operating cycle.

Conveyor 92 in dryer 88 when operating makes contact with and moves up and over sprocket wheel 94b, then forward in the direction shown onto supporting rail or track 93, contacting and moving down and under sprocket wheel 94a. It then moves in a counter direction onto supporting rail or track 93 contacting and moving up and over sprocket wheel 94b as before to repeat the operating cycle. The endless conveyor 101 when operating in conjunction with the conveyor 92 makes contact with and moves up and over sprocket wheel 104b, then onto and over supporting rail or track 102, contacting and moving down and under sprocket wheel 104a and moving in a counter direction under rail 106, making contact with and moving up and over sprocket wheel 104b as before to repeat the operating cycle.

At established intervals, electro-magnets 114 are mounted on and attached to the endless conveyor 101. When operating, the electro-magnets 114 with conveyor 101 moves down and under sprocket wheel 104a and makes contact with conveyor 92 and rail 106, preferably approximately under sprocket wheel 104a. The rail 106 also serves as a source of electrical energy to activate the electro-magnets 114 when they first contact it and remain activated while moving in the direction shown and become deactivated when moving out of contact with rail 106, preferably approximately under sprocket wheel 104b. The electro-magnets 114 while activated make rigid contact with conveyor 92 and with conveyor 101 and are caused to move forward at the same predetermined rate as conveyor 92. The conveyor 101 is not necessarily motor driven.

In a preferred embodiment of my invention chamber 34 of regenerating apparatus 20 is maintained at a substantially constant temperature of from about 55° C. to about 75° C. preferably by feeding a controlled amount of atmospheric steam into the chamber. Chamber 36 is maintained at a substantially constant temperature of from about 95° C. to about 100° C., preferably by feeding saturated steam into the chamber.

A sponge forming mixed mass paste composition P is prepared in suitable conventional mixing apparatus, mixed preferably at room temperature, and transferred to hopper 14 of the extruding apparatus 10. The screw 12 of extruding apparatus 10 is continuously delivering an amount of paste composition P to and through the extruder nozzle 16 into the continuously forward moving sponge forming resilient mold 18 at a point preferably immediately above pulley 42 in chamber 34 of the regenerating apparatus 20 at a rate to fill and to thereafter remain stationary in the mold 18 as it moves through chambers 34 and 36.

Moving through chamber 34 the mold 18 with its stationary contents is subjected to the maintained temperature of chamber 34 and, when it passes through port 38a of regenerating apparatus 20, the cellulose of the viscose solution component of the mixed mass paste composition P has become partially regenerated to a substantially immobile and homogeneous gel-like mass.

Moving through chamber 36 of the regenerating apparatus 20, the mold 18 with its stationary gel-like mass is subjected to the maintained temperature of chamber 36 and, when it arrives at a point immediately above pulley 40, the stationary gel-like mass has become a completely regenerated cellulose sponge S. When arriving at the point immediately above pulley 40, the sponge S in mold 18 makes contact with and is scooped up and removed from the mold by the sponge release mechanism 39, the scooped up sponge S then passing through mechanism 39 and out of regenerating apparatus 20.

Upon entering apparatus 44, the sponge S first moves onto the continuously moving endless woven wire open mesh screen conveyor 48 where it becomes positioned between spacers 50. The spacers 50 attached to conveyor 48 are placed so that the sponge S snugly fits between the spacers as shown in FIGURE 6.

Conveyor 48 with sponge S attached first continuously moves onto and over suction box 52 where the sponge is being washed free of processing chemicals with about 80° C. fresh water from spray nozzles 54. Most of the wash water passes through the sponge S, through openings in the woven wire open mesh screen conveyor 48, into suction box 52 and then overflowing down through conduit 58 into receiving tank 56.

Conveyor 48 with the wash sponge S attached continuously moves onto and over suction box 66 where the sponge is being bleached with dilute bleach solution from spray nozzles 64. Most of the bleach solution passes through the sponge S, through the openings in the woven wire mesh screen conveyor 48, into suction box 66 and then overflowing down through conduit 68 into receiving tank 70.

Conveyor 48 with the bleached sponge S attached next continuously moves onto and over suction box 74 where the sponge is washed free of residual spent bleach with water from spray nozzles 72. Most of the wash water passes through the sponge S, through the openings in the woven wire open mesh screen conveyor 48, into suction box 74 and then overflowing down through conduit 78 into receiving tank 76.

Finally, the conveyor 48 with the washed sponge S attached continuously moves onto and over suction box 80 where additional wash water may be removed from the sponge. This last removed water passes through the openings in the woven wire open mesh screen conveyor 48, into suction box 80 and then overflowing down through conduit 82 into receiving tank 84.

The suction boxes 52, 66, 74 and 80 are preferably maintained at partial vacuums by individual suction pumps (not shown) for easier control. The vertical conduits 58, 68, 78, and 82 terminating under the surfaces of the solutions in receiving tanks 56, 70, 76 and 84 act as seals to maintain the partial vacuums of about 8 feet vertical columns of water in the conduits.

The regenerated cellulose sponge S leaving the apparatus 44, moves onto the endless conveyor 92 in drying apparatus 88 as shown in FIGURE 7. The sponge, placed on the endless moving conveyor 92, is carried in the direction shown while being continuously dried, preferably by relatively low or ambient temperature high humidity counter current circulating air.

While the sponge S is being dried, lineal shrinkage is controlled and warpage avoided. In the latter part of the drying operation where most shrinkage normally tends to occur, a second conveyor 101 makes rigid contact with conveyor 92. Electro-magnets 114 mounted at selected intervals on conveyor 101 rigidly contact the steel conveyor 92. Sponge compression pins 116 which are part of the electro-magnets 114 compress the sponge S being dried thus holding it in rigid position in relation to conveyor 92. Thus, further lineal shrinkage is avoided.

The dried sponge S of indeterminate and continuous length is detached from the conveyors 92 and 101 and moves out of the dryer 88 and is cut into convenient lengths for handling and packaging for shipment. Such lengths, for example five foot lengths, may correspond to the lineal distance between sponge compression pins 116 of the electro-magnets 114 where the sponge has been deformed as shown in FIGURES 8 and 9.

The endless sponge forming mold 18 is advantageously made of a material that will be resistant to any corrosive or other deteriorating action originating from the sponge forming past composition P and from the maintained heats in the regenerating apparatus 20. Certain rubber compositions including silicone rubber have been found to meet these requirements. Thin walled tempered stainless steel, if properly formed, may also be used in some operating procedures.

The illustrated drawings show the making of cylindrical shaped sponges. When a sponge having a shape other than cylindrical, for example elliptical, square, rectangular or other shape in cross section is desired, the sponge forming mold 18 should have the desired shape. Of course, where necessary other pertinent portions of the apparatus such as the mold supporting frames 24 in apparatus 20 must also be modified to accommodate the different shapes.

Regenerated cellulose sponge of indeterminate and continuous length, according to my invention are fine, medium or coarse pore products and comprised of regenerated cellulose having varying shaped cross sections. When the sponges are cut into appropriate lengths they may be adapted for use, depending on shape and size, as cigarette filters, surgical sponges, air filters, oil filters, gasoline filters, wine filters, milk filters, water filters, filters for general uses, menstrual tampons, component for sanitary napkins, sponges for general cleansing in the home and in industry and for conventional other well established sponge and other uses.

In the claims:

1. In a process for continuously producing regenerated cellulose sponge of indeterminate and continuous length, the steps of continuously extruding a sponge forming paste composition containing viscose solution and sponge pore forming crystals into an endless open top mold and continuously moving mold at a selected rate to fill the mold, continuously moving the filled open top mold through cellulose regenerating apparatus while the contents of the filled mold remains stationary in the continuously moving open top endless mold whereby the cellulose of the viscose solution is continuously regenerated by heat and a regenerated cellulose sponge is continuously being formed, continuously removing the formed sponge from the endless open top mold, continuously moving said sponge out of said regenerating apparatus, treating the formed sponge to the steps of washing, bleaching and rewashing and partial dewatering the sponge by suction means after the rewashing step, then moving the formed sponge continuously into and through drying apparatus at a rate of forward movement to control lineal shrinkage and avoid warpage of said drying sponge and, after drying, cutting the indeterminate and continuous length of dry sponge into lengths for handling and packaging, all said steps to be in timed relation whereby a continuous process is obtained.

2. In a process for continuously producing regenerated cellulose sponge of indeterminate and continuous length as defined in claim 1, wherein the continuously moving open top mold is an endless lineally slitted slightly open top and resilient mold and wherein the cellulose sponge regenerating apparatus is comprised of two attached chambers, said chambers maintained at two different and substantially constant elevated temperatures above ambient whereby the cellulose of the viscose solution component of the sponge forming paste composition in endless mold while in the first heated chamber is continuously partially regenerated to form a substantially immobile and homogeneous gel-like mass and while moving through second heated chamber is completely regenerated to form a regenerated cellulose sponge.

3. Apparatus for continuously producing regenerated cellulose sponge of indeterminate and continuous length from a sponge forming paste composition containing viscose solution and sponge pore forming crystals, said apparatus comprising means adapted for continuously extruding said paste composition into a continuously movable endless mold whereby said paste composition remains stationary in the endless mold, said mold supported on frames attached to an endless continuously movable driven link-belt support on rails, a cellulose regenerating chamber surrounding the said continuously movable link belt whereby the cellulose of the viscose solution of the sponge forming paste composition in the mold while continuously moving through heated regenerating chamber means is regenerated to form regenerated cellulose sponge, means adapted for continuously removing the formed sponge from the endless mold and means adapted to carry the sponge out of said cellulose sponge regenerating chamber means, means adapted to wash, bleach, rewash and at least partially dewater the formed sponge, said means comprising a movable endless woven wire oven mesh driven conveyor having spacers attached thereto and movable therewith, said formed sponge adapted to remain in close stationary contact with said spacers, spray nozzles positioned above said conveyor and suction boxes beneath said conveyor, and means adapted to maintain said suction boxes at partial vacuum whereby said formed sponge after being washed, bleached, and rewashed by sprays from said nozzles is then partially dewatered.

4. Apparatus for continuously producing regenerated cellulose sponge as defined in claim 3 and further including means adapted to move continuously said formed and partially dewatered sponge through a drying apparatus and means adapted to control the lineal shrinkage and avoid warpage of said sponge being dried by the drying apparatus, steel conveyor, forward conveyor movement control means adapted to avoid sponge warpage, and electro-magnetic means adapted to be attached to said conveyor whereby said sponge is held in rigid position in relation to the controlled movement of the endless conveyor and shrinkage of said sponge is controlled and warpage is avoided.

5. Apparatus for continuously producing regenerated cellulose sponge of indeterminate and continuous length from a sponge forming paste composition containing viscose solution and sponge pore forming crystals, said apparatus comprising extruder means adapted to continuously extrude said paste composition through an extruder nozzle into a continuously movable, endless open top mold whereby the paste composition is continuously extruded into the mold, said paste composition adapted to remain stationary in the continuously movable mold, said mold supported on frames attached to an endless continuously movable driven link-belt supported on rails, cellulose regeneration chamber means surrounding said movable link-belt whereby the cellulose of the viscose solution component of the sponge forming paste composition in the mold while continuously moving through the regeneration chamber is regenerated to form regenerated cellulose sponge, a sponge release mechanism adapted to remove the formed sponge from the endless mold, means adapted to wash, bleach, rewash and partially dewater said wet formed sponge, said means comprising sponge spacers attached to a movable endless open mesh driven conveyor, said spacers adapted to separate the sponges in the direction of travel, spray nozzles positioned above said conveyor and suction boxes beneath said conveyor and opposite said nozzles and means maintaining said suction boxes at partial vacuum whereby the formed sponge is continuously washed, bleached, rewashed by spray from said nozzles and then partially dewatered, drying apparatus and sponge lineal shrinkage control means including a movable driven endless steel conveyor, formed movement conveyor control means, electro-magnetic means adapted to be attached to said steel conveyor whereby said sponge is compressed at selected intervals and held in rigid position in relation to the movable endless steel conveyor so that shrinkage of said sponge is controlled during drying.

6. Apparatus for continuously producing regenerated cellulose sponge of indeterminate and continuous length from a sponge forming paste composition containing viscose solution and sponge pore forming crystals as defined in claim 5 wherein said mold is an endless, lineally slitted slightly open top and resilient mold, said extruder nozzle adapted to further open the slit in said mold, said frames adapted to return the mold to a lineally slitted slightly open top condition, said release mechanism adapted to open the slit in said mold and further adapted to remove the formed sponge from the endless mold; the cellulose sponge regenerating means adapted to be heated and comprised of two attached chambers, said chambers adapted to be maintained at two different and substantially constant elevated temperatures above ambient whereby the cellulose of the viscose solution component of the sponge forming paste composition in the mold is partially regenerated to form a substantially immobile and homogeneous gel-like mass while moving through first heated chamber and completely regenerated to a regenerated cellulose sponge while moving through the second chamber.

References Cited
UNITED STATES PATENTS

| | | |
|---|---|---|
| 1,646,989 | 10/1927 | Blecker. |
| 2,064,512 | 12/1936 | Wilson et al. _____ 68—62 X |
| 2,251,931 | 8/1941 | Gundelfinger _____ 68—45 X |
| 2,488,446 | 11/1949 | Swiss _____ 18—47 |
| 2,565,575 | 8/1951 | Runton _____ 34—155 X |
| 2,584,043 | 1/1952 | Oberly _____ 34—155 |
| 2,899,704 | 8/1959 | Pekarek. |
| 3,011,218 | 12/1961 | Mitten _____ 264—47 |
| 3,048,888 | 8/1962 | Schockley et al. ____ 264—49 X |
| 3,078,505 | 2/1963 | Mitten _____ 18—4 |
| 3,096,161 | 7/1963 | Morrison et al. _____ 34—155 X |
| 3,223,053 | 12/1965 | Jimenez et al. _____ 198—165 X |
| 3,261,704 | 7/1966 | Steig _____ 106—122 |
| 3,281,894 | 11/1966 | Buff et al. _____ 18—4 |

FOREIGN PATENTS 1,081,375   5/1960   Germany.

ALEXANDER H. BRODMERKEL, *Primary Examiner.*

P. E. ANDERSON, *Assistant Examiner.*